Oct. 18, 1927.
G. A. SHOEMAKER
1,646,371
BEARING AND METHOD OF MAKING SAME
Filed Sept. 20, 1922    2 Sheets-Sheet 1
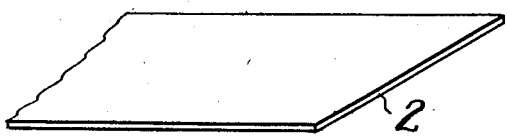
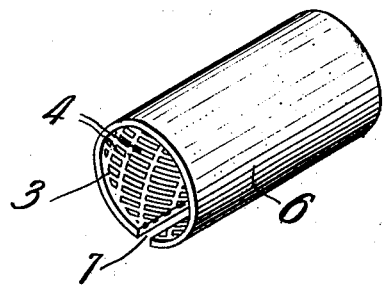
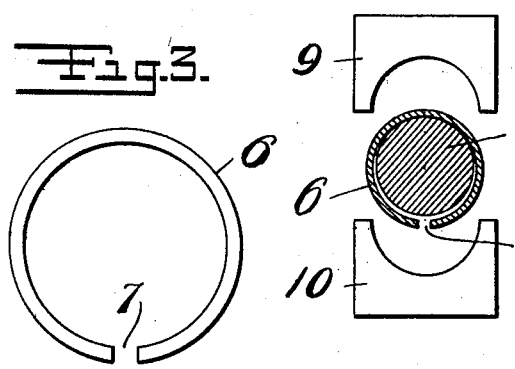
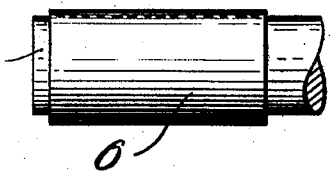
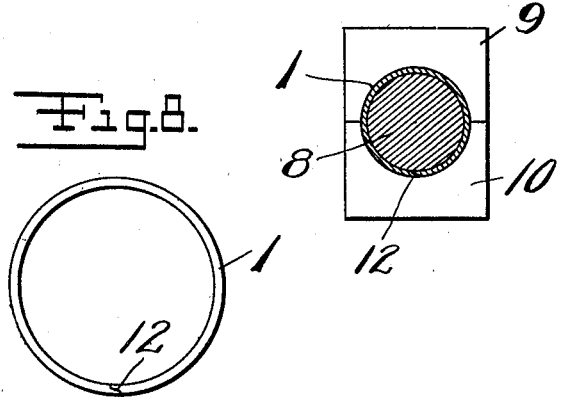
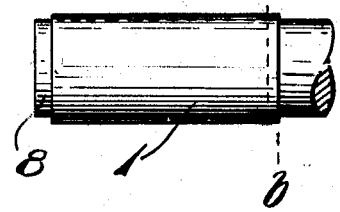
INVENTOR
George A. Shoemaker
By William Fowler
ATTORNEY Oct. 18, 1927.
G. A. SHOEMAKER
1,646,371
BEARING AND METHOD OF MAKING SAME
Filed Sept. 20, 1922      2 Sheets-Sheet 2
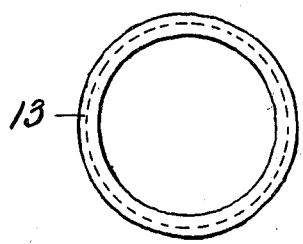
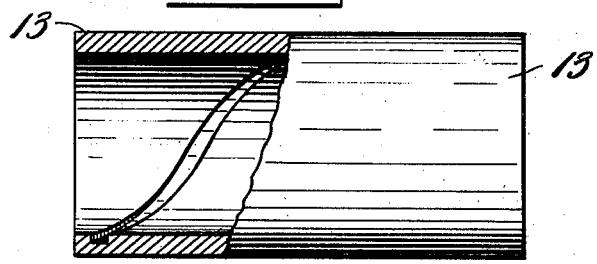
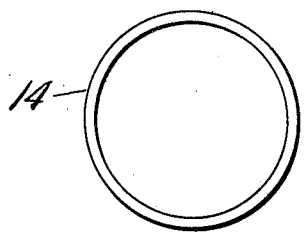
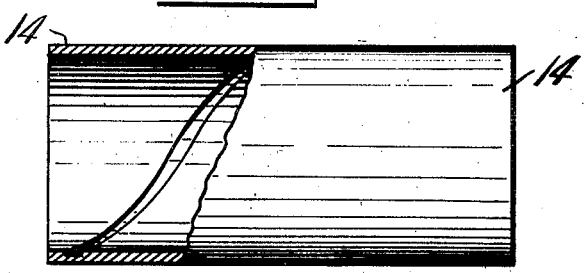
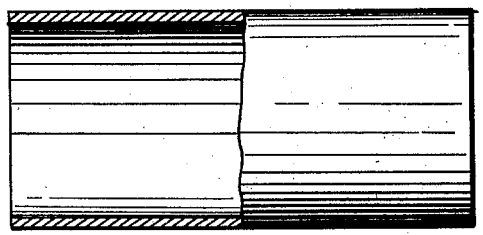
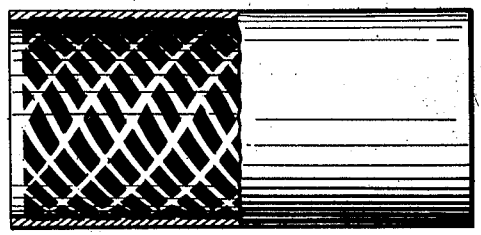

Patented Oct. 18, 1927.

1,646,371

UNITED STATES PATENT OFFICE.

GEORGE A. SHOEMAKER, OF PHILADELPHIA, PENNSYLVANIA, ASSIGNOR TO BOUND BROOK OIL-LESS BEARING COMPANY, OF BOUNDBROOK, NEW JERSEY, A CORPORATION OF NEW JERSEY.

BEARING AND METHOD OF MAKING SAME.

Application filed September 20, 1922. Serial No. 589,318.

This invention relates generally to an improved bearing of the plain or the self-lubricated type and to a method of making the same.

In the manufacture of bearings of the general type referred to, it has been the practice to produce the necessary hollow cylinder or bushing either from flat metal stock in a suitable forming operation, or to produce the cylinder directly in the form of a casting. Before either type of shell or cylinder referred to could be used for the desired purpose it was necessary to reduce the article to the requisite radial dimensions in a series of cutting operations usually including a preliminary rough cut in which the major portion of surplus metal was removed, and a slow and tedious finish cut made with a relatively high degree of accuracy. The referred to cutting operations and particularly the finish cut in which great care was required to produce a product with the necessary precision in dimensions, were costly to produce because of the time and skill required for their proper accomplishment, and this, together with the wastage arising out of spoiled work, produced bearings that were relatively expensive.

In the course of experiments conducted for the purpose of reducing or eliminating the relatively expensive cutting operations referred to, I have found that an over-size rough shell formed in either of the ways described can be brought to the precise dimensions desired in a simple easily-controlled swaging operation in which the rough cylinder or shell in cold condition is placed on an arbor and swaged by being subjected to a succession of hammer blows between oppositely disposed swaging dies. The desired radial dimensions are established in the cylindrical bearing thus produced by carefully constructing the arbor so that its external contour is the same as the internal contour of the bearing to be formed and also constructing the dies so that when they are brought to their ultimate closed position in a series of swaging operations they will produce the desired external contour on the cylinder and establish a predetermined thickness in the cylinder wall.

I have found that not only is the rough preliminary shell brought to its final precisely dimensioned form in a single, rapid swaging operation requiring no especial skill to control, but the bearing thus obtained is superior in many ways to the same general type of bearing produced by prior methods of manufacture. One of the principal advantages of the bearing produced by the herein described method consists in the improved quality of the metal arising out of the working to which it is subjected in the swaging operation while cold. Accompanying the reduction in thickness of the shell in the swaging operation a lateral flow of the metal and corresponding elongation of the shell takes place but the compression of the metal under the hammer blows of the forging operation renders the metal more compact, and correspondingly increases its hardness, toughness and mechanical strength. As a result the bearing possesses a greater capacity for resisting wear than was possessed by prior bearings and has a correspondingly greater endurance and longer life.

In addition to the qualities named, the bearing, which is preferably formed of bronze or other relatively malleable metal, has its ductility, elasticity and tensile strength enhanced by the working or swaging to which the metal is subjected. I find also that the smooth and polished surfaces of the carefully prepared arbor and dies is repeated in the engaged inner and outer surfaces of the bearing shell with the result that a minimum degree of friction is created between the bearing and the relatively moving parts with which it may be associated in operation.

Other features of the invention will be hereinafter referred to.

In the drawings, in which are illustrated preferred forms of my improved bearing and operative steps in the method of making the same, Figure 1 is a view in perspective of a metal blank from which sections of an appropriate length may be cut to produce a bearing of the desired size.

Figure 2 is a view in perspective showing a section of the blank formed into a substantially cylindrical formation and with the inner surface provided with lubricant holding cavities.

Figure 3 is an enlarged end view of the article shown in Figure 2.

Figure 4 is a view largely diagrammatic of cylindrical member of Figure 2 mounted on an arbor between separated swaging dies ready for a forging operation.

Figure 5 is a side view of the mandrel and cylinder supported thereby of Figure 4.

Figure 6 is a view similar to Figure 4 showing the dies in closed position at the end of a swaging operation.

Figure 7 is a view similar to Figure 5 showing the finished bearing following the swaging operation.

Figure 8 is an end view on an enlarged scale of a finished bearing showing the overlapped and interlocking relation of the abutting edges of the section of metal used in forming the bearing.

Figure 9 is an end view of a cast metal cylindrical blank from which a bearing may be formed.

Figure 10 is a side view partly broken away of the cylindrical blank shown in Figure 9.

Figure 11 is a view similar to Figure 9 showing an end view of a finished bearing of the cast metal type.

Figure 12 is a view similar to Figure 10 showing a side view partly broken away of a finished cast type bearing.

Figure 13 is a view similar to Figure 12 showing a cast metal bearing of a plain type constructed in accordance with the invention.

Figure 14 is a view similar to Figure 13 showing a cast bearing of the self-lubricating type.

Referring to the drawings for a more detailed description of the invention, a bearing or bushing 1 is formed from a section of metal cut from a strip of blank stock 2 whose width is approximately the same as either the axial or circumferential length of the bearing to be produced. If the bearing under construction is to be of the self-lubricating type, the metal sections or the blank strip 2 may be provided with indentations or pockets 3 arranged in any desired design on the surface which is to subsequently form the working surface of the bearing. These pockets may be filled with a suitable material 4 such as a compound of graphite which may be applied in a plastic condition and baked to produce a necessary hardness and solidity of structure.

In the manufacture of my improved bearing from sheet metal stock as illustrated in Figures 1 to 8 of the drawing, the section of metal cut from the stock blank 2 is brought to a substantially cylindrical or tubular formation as indicated in Figure 2, in any suitable or desired forming operation. It is not necessary to bring the axially extending edges of the shell into closely abutting relation but the edges may be permitted to spring apart as at 7, to provide an expansion or enlargement in the diameter of the shell such as will permit it to be easily placed in position on an arbor 8 as shown in Figures 4 and 5 of the drawing.

The arbor 8 serves as an anvil on which to support the shell 6 in a swaging operation effected by the reciprocation of the swaging dies 9 and 10 toward and from each other and the interposed arbor-supported shell, but the arbor 8 also serves the purpose of a templet or size-determining element for the interior diameter of the bearing shell. For this purpose the exterior diameter of the mandrel is accurately ground to the precise size of the interior diameter desired in the finished article. For a like reason the convex forming surfaces of the dies 9 and 10 are accurately ground to produce the desired curvature for the external surface of the shell or bushing so that when the edges 11 of the dies are brought into contact in the progress of the swaging operation the shell has been reduced to a uniform thickness having concentric internal and external peripheral surfaces. In addition, the work engaging surfaces of the arbor and dies are given a polished finish which is reproduced in the engaged surfaces of the bearing thereby reducing to a minimum the friction developed in operation.

In the swaging operation described the cold metal flows or spreads laterally as its thickness is reduced, so that the shell or cylinder is axially elongated somewhat as shown at a—b in Figure 7. At the same time the circumferential length of the shell tends to increase so that the gap or opening 7 between the confronting edges of the shell is closed up and the edges are not only brought into abutting engagement but they are forced and spread into an overlapped or tongue and groove relation to provide a rigid seam or joint as indicated at 12 in Figure 8. If desired the swaged shell may have one or both ends trimmed to bring the finished length to the desired measurements, or the length of the preliminary shell may be such that when subjected to the swaging operation the length will not require change.

In Figures 9 to 14 of the drawing is shown a bearing formed from cast metal instead of sheet metal stock. A cast metal hollow cylinder 13, preferably after being subjected to a slight preliminary rough cut on either or both its exterior and interior surfaces either by broaching or turning, is subjected while cold to a swaging operation such as has already been referred to. The swaging operation in this case also reduces the thickness of the shell and correspondingly increases its length as indicated in Figures 11 and 12. The metal is also made more compact or dense with an increase in hardness and a corresponding improvement in other characteristics of the metal such as have been already described in the sheet metal type of bearing.

The inner surface of the cast bearing, as well as the sheet metal bearing, may be left smooth or plain as in Figure 13 of the drawing in which independent lubrication is required, or either type of bearing may be provided with cavities for holding solid lubricant as in Figures 2 and 14, or either type may be provided with oil grooves as at 16 in Figures 10 and 12.

Another feature of the invention resides in the opportunity given for reducing worn bearings whose internal diameters have been increased beyond their normal size determined by the sizing mandrel on which they are placed for swaging. It will be seen that they can be quickly and readily brought back to their original accurate size in the simple swaging operation described and without further treatment.

It will be seen that the swaged type of bearings produced by my process are superior in many ways to bearings of the same general character heretofore known, in that the character of the metal is improved in the working, the cost of manufacture is greatly cut down, and a more substantial and durable bearing produced. In addition to the increase in hardness and toughness of the bearings the polished or burnished finish produced on the working surfaces is availed of to reduce friction in operation. Preferably the blank is subjected to the swaging operation while in a cold condition although the work may be heated as circumstances warrant. While a cylindrical bearing has been illustrated and described it will be clear that the bearing may have a conformation other than a round or circular one to provide for a longitudinally slidable rather than a rotatable shaft.

While the finished bearing herein shown and described, is constructed with the lubricating surface on one side, it will be understood that both the inside and outside surfaces thereof may be arranged for lubrication, and that instead of cavities or pockets being formed in said surface or surfaces, the body of the metal shell or bearing may be perforated for receiving and retaining the lubricating compound, in a manner well known; the perforated places being formed by stamping, casting or drilling. In some cases the bearing is finished with the split or slot unclosed and is left open for use in that condition, or so that the bearing may be burnished in place.

Any of the well known methods of and means for forging by swaging the metal body in its blank form into finished or partially finished condition may be used in connection with my improvements.

What I claim is:

1. A bearing formed of malleable metal toughened and hardened by swaging while cold by means of a succession of duplicate hammer blows moving toward and from each other.

2. A bearing consisting of a hollow metal cylinder swaged while cold by a succession of duplicate hammer blows oppositely disposed to each other into fitting relation to an arbor corresponding in size to the shaft on which the cylinder is to be mounted for operation, whereby the internal diameter of the bearing is established.

3. A bearing consisting of a hollow metal cylinder swaged while cold by oppositely disposed reciprocating swaging dies into fitting relation to an arbor corresponding in size to the shaft on which the cylinder is to be mounted for operation, whereby the internal diameter of the bearing is established, and the swaging die serving to establish a definite external size for the bearing.

4. A bearing consisting of a section of sheet metal formed into a split tube, and said split tube being subjected to a swaging operation while cold by a succession of oppositely disposed hammer blows to cause the confronting edges of the tube to be interengaged to form a cylinder.

5. A bearing consisting of a hollow metal cylinder swaged into engagement with a polished arbor placed in the hollow thereof by a succession of duplicate and oppositely disposed hammer blows, the swaging operation being carried to a point that will produce an increased density and corresponding polish of the inner surface of the cylinder in contact with the arbor.

6. The herein described method of reclaiming metal bushings worn by usage to oversize, which consists in placing the bushing on a mandrel of the size to which the bushing is to be re-sized and then swaging or hammering the bushing from opposite radial directions while cold by a succession of oppositely disposed hammer blows on the mandrel until it fits the same by the contraction of its diameter.

7. The method of producing a tubular metallic bushing, which consists in first bending a strip of metal into the approximate shape and placing the same upon a mandrel having the desired shape and size, and subjecting substantially the entire outer surface of the bent strip while cold to a rapid hammering action from opposite radial directions and of sufficiently long period for causing the metal to flow and the free abutting edges of the same to become closed and the metal rendered more dense and harder.

8. The method of producing a tubular metallic bearing, which consists in first forming the metal into the approximate shape and size, placing the tubular article thus formed upon a mandrel of the desired shape and size, and subjecting the outer surface of the article while cold upon the mandrel to the action of rapid blows from opposite radial direction produced by hammering elements which are adapted to substantially completely enclose such outer surface, such rapid hammering action being continued by each of the hammering elements for a suitable period so that the metal in the article flows and is made into the proper shape and size and such metal is rendered more dense and harder.

Signed at Boundbrook in the county of Somerset and State of New Jersey this 15th day of September, A. D. 1922.

GEORGE A. SHOEMAKER.